United States Patent [19]

Fukui et al.

[11] Patent Number: 5,195,072
[45] Date of Patent: Mar. 16, 1993

[54] ERROR DETECTING DEVICE FOR OPTICAL HEAD

[75] Inventors: Kenji Fukui, Fujisawa; Akira Kawai, Yokohama, both of Japan

[73] Assignee: Tosoh Corporation, Yamaguchi, Japan

[21] Appl. No.: 327,820

[22] Filed: Mar. 23, 1989

[30] Foreign Application Priority Data

Mar. 25, 1988 [JP] Japan .................. 63-69867
Apr. 13, 1988 [JP] Japan .................. 63-89268
Jun. 27, 1988 [JP] Japan .................. 63-156852

[51] Int. Cl.$^5$ ........................... G11B 7/085
[52] U.S. Cl. .............. 369/44.23; 369/44.14; 369/44.41; 369/112
[58] Field of Search ........... 369/44.24, 44.11, 44.23, 369/44.25, 44.32, 44.14, 59, 44.12, 44.37, 44.38, 44.41, 112, 109, 110; 250/201.5

[56] References Cited

U.S. PATENT DOCUMENTS

4,817,074 3/1989 Yamanaca .............. 369/44.24
4,895,790 1/1990 Swanson et al. .......... 430/321 X

FOREIGN PATENT DOCUMENTS

0084703 3/1983 European Pat. Off.
0180767 5/1986 European Pat. Off.
0283002 9/1988 European Pat. Off.
2445333 4/1975 Fed. Rep. of Germany.
1488691 12/1977 United Kingdom.

OTHER PUBLICATIONS

Patent Abstracts of Japan, vol. 9, No. 239 (P-391) (1962) Aug. 25, 1985, and JP-A-60 93643 (Toshiba K.K.) May 25, 1985.
Patent Abstracts of Japan, vol. 8, No. 129 (P-280) (1566) Jun. 15, 1984, and JP-A-59 33637 (Mitsubishi Denki K.K.) Feb. 23, 1984.

Primary Examiner—Roy N. Envall, Jr.
Assistant Examiner—Hung Dang

[57] ABSTRACT

An error detecting device for an optical head detects a focussing error and a tracking error. The error detection device includes an optical structure for converting a reflected light of a light irradiating a surface to be irradiated into an astigmatic pencil of rays having a first focal point and a second focal point, the optical structure having a first focussing member for focussing the reflected light on the first focal point of the astigmatic pencil of rays, and a second focussing member for focussing the reflected light on the second focal point of the astigmatic pencil of rays, the first and the second focussing members being made integral, and a device for detecting errors of the light irradiating the surface to be irradiated, based on a detecting signal of a spot of the reflected light formed by the first focussing member, and a detecting signal of a spot of said reflected light formed by the second focussing member. The error detecting device can be small-sized and light, have a small astigmatic difference, easily to align optical elements.

8 Claims, 10 Drawing Sheets

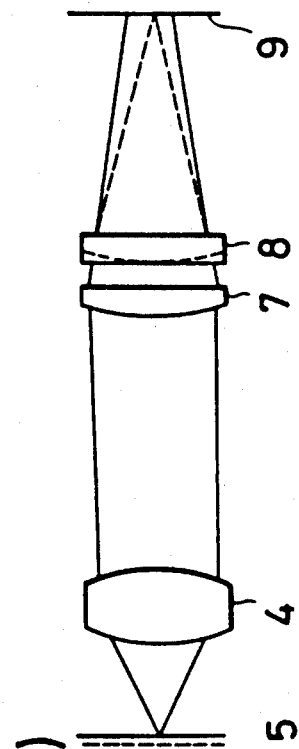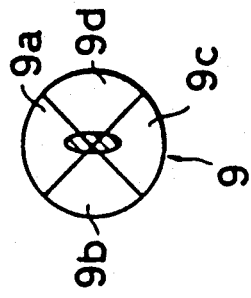
FIG. 2a(1) PRIOR ART
FIG. 2a(2) PRIOR ART
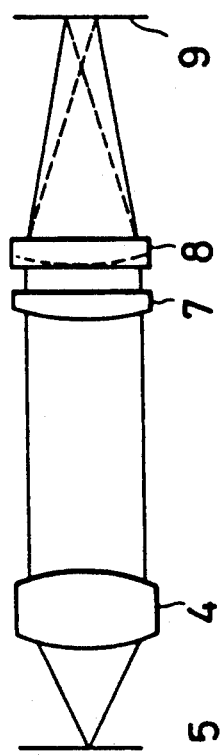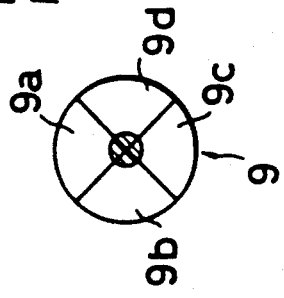
FIG. 2b(1) PRIOR ART
FIG. 2b(2) PRIOR ART
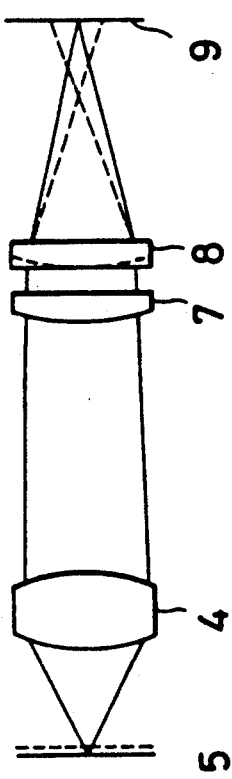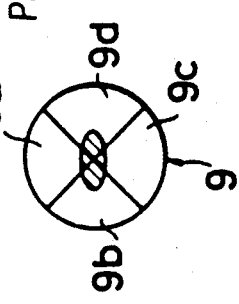
FIG. 2c(1) PRIOR ART
FIG. 2c(2) PRIOR ART

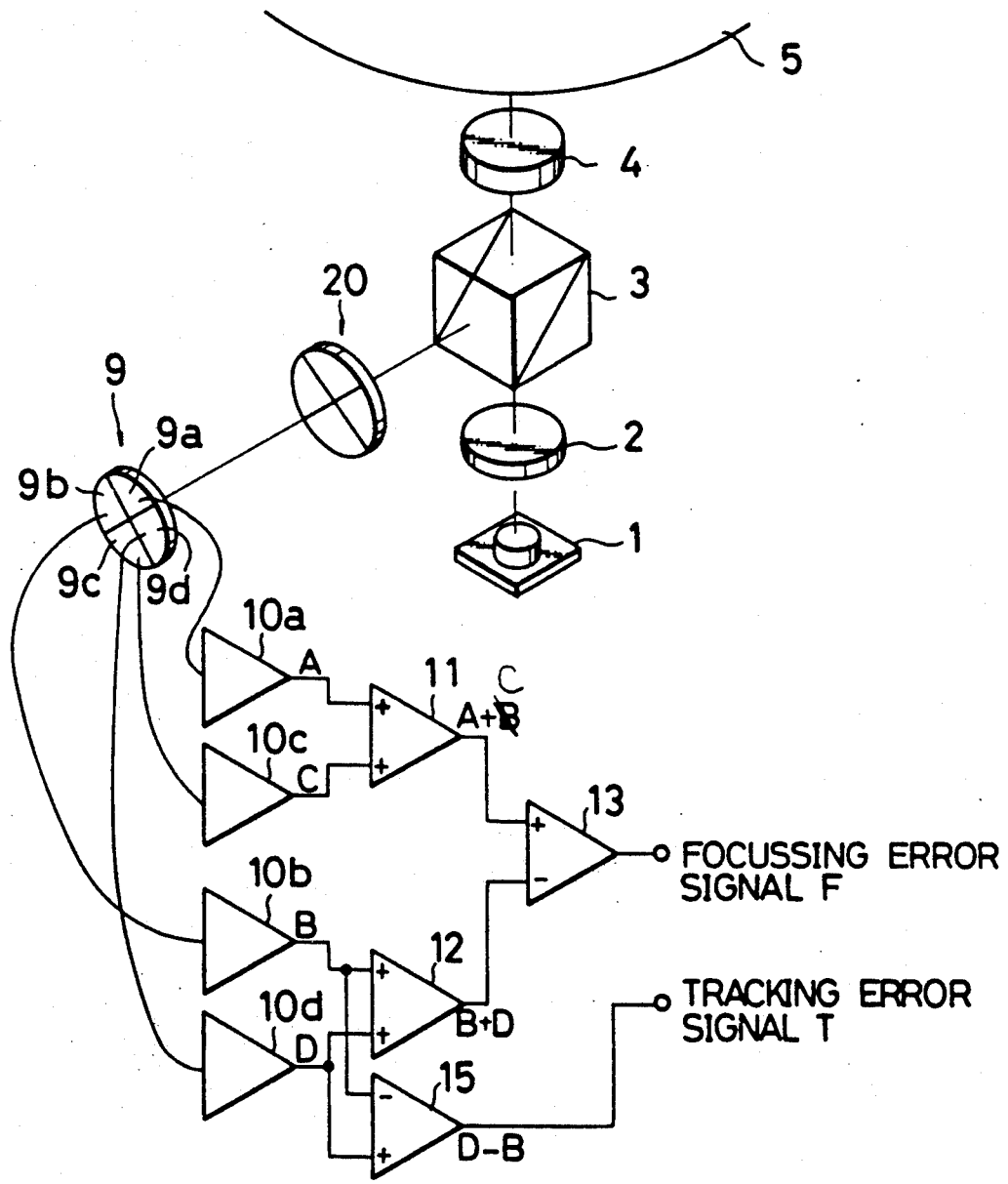

FIG.5(a)
FIG.5(b)
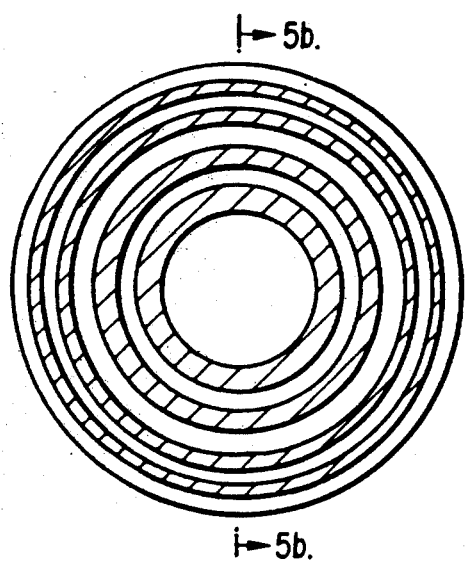
FIG.6(a)
FIG.6(b)
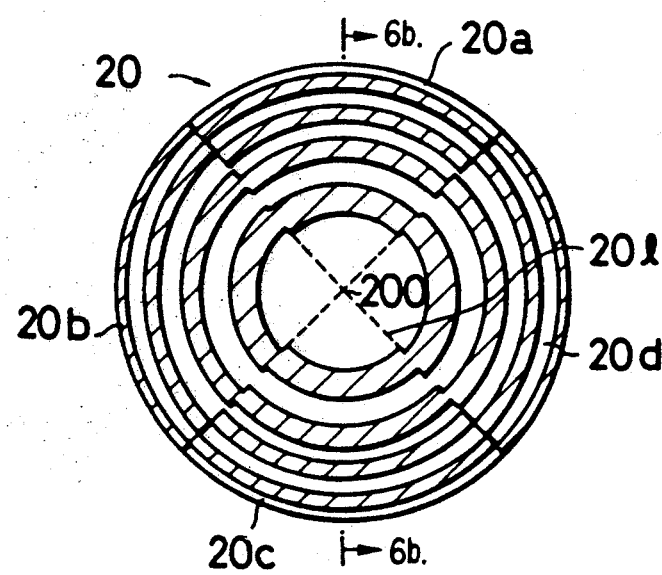

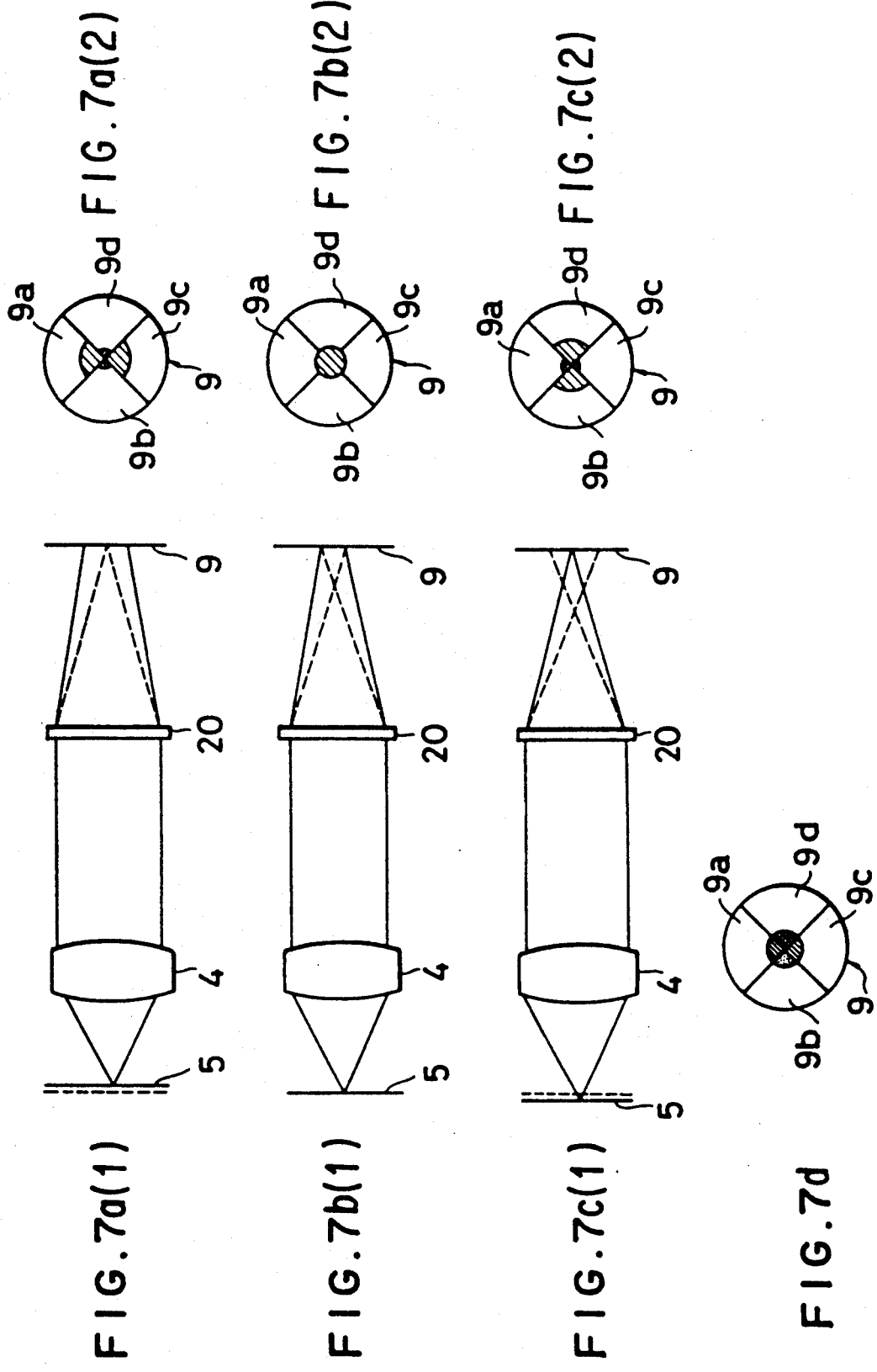

ERROR DETECTING DEVICE FOR OPTICAL HEAD

BACKGROUND OF THE INVENTION

This invention relates to an error detecting device for an optical head which detects a focussing error and a tracking error.

Recently, products utilizing the laser technique have been developed together with the progress of the semiconductor laser. Presently, among the products, especially the optical disc has attracted attention. Among the presently commercially available optical discs, read only optical discs, such as compact discs (CD) and laser discs (LD), and write once optical discs for use in document files, video files, memories of computers, etc. have entered practicable stages. In addition, erasable optical disks which can write, read and erase information will be soon commercialized.

The optical head is an essential member for writing and reading information in and from optical discs. In order to write and read information by an optical head it is necessary to control the optical head so that a beam of laser light can correctly irradiate a desired track of an information recording medium.

The error detecting device for the optical head detects a focussing error and a tracking error of a beam of laser light irradiating an information recording medium. Based on detecting signals of the focussing error and the tracking error, the optical head is feedback controlled.

In the error detecting device for an optical head, a focussing error and a tracking error are detected, based on a reflected light of a beam of laser light irradiating an optical disc. The reflected light for the error detection is formed by a convex lens and a cylindrical lens into an astigmatic pencil of rays, which has astigmatic wave fronts. This astigmatic pencil of rays is focussed on a quadrant photo detector. Based on the light detecting signals from respective quarter sections of the quadrant photo detector, a focussing error signal is produced.

As described above, in the conventional error detecting device, a convex lens and a cylindrical lens are used to form a focussing error detecting light into an astigmatic pencil of rays. A consequent problem is that the miniaturization of the error detecting device is difficult. Furthermore, the curvature of radius of the cylindrical lens has to be large in order to improve the error detecting precision. Increasing the curvature of radius of the cylindrical lens results in small production tolerances in eccentricity of optical elements and generatrix of alignment of the convex cost, and the difficulty of alignment of the convex lens, the cylindrical lens and the quadrant photo detector.

SUMMARY OF THE INVENTION

An object of this invention is to provide an error detecting device for an optical head which is small-sized and light, has a small astigmatic difference and is easy to align optical elements.

This object can be achieved by an error detecting device for an optical head, comprising: optical means for converting a reflected light of a light irradiating a surface to be irradiated into an astigmatic pencil of rays having a first focal point and a second focal point, said optical means having a first focussing member for focussing said reflected light on said first focal point of said astigmatic pencil of rays, and a second focussing member for focussing said reflected light on said second focal point of said astigmatic pencil of rays, said first and said second focussing members being made integral; and means for detecting errors of said light irradiating the surface to be irradiated, based on a detecting signal of a spot of said reflected light formed by said first focussing member, and a detecting signal of a spot of said reflected light formed by said second focussing member.

This invention, which has the optical system formed integral, can realize an error detecting device which is small-sized and light, has a small astigmatic difference, and is easy to align optical elements.

BRIEF DESCRIPTION OF THE DRAWINGS

FIGS. 2(a), (b) and (c) are views of spots of error detecting light of the prior art;

FIG. 4 is a block diagram of the error detecting device for an optical head according to one embodiment of this invention;

FIGS. 5(a) and (b) are a plan view of the usual Fresnel zone plate, and a sectional view of the same along the line a—a';

FIGS. 6(a) and (b) are a plan view of a quadrant Fresnel zone plate used in the error detecting device for an optical head of FIG. 4, and a sectional view of the same along the line b—b';

FIGS. 7(a), (b), (c) and (d) are views of spots of the error detecting light of the error detecting device for an optical head of FIG. 4;

DETAILED DESCRIPTION OF THE INVENTION

The error detecting device for the prior art optical head will be explained with reference to FIGS. 1 to 3 before this invention is explained.

Figure 1:
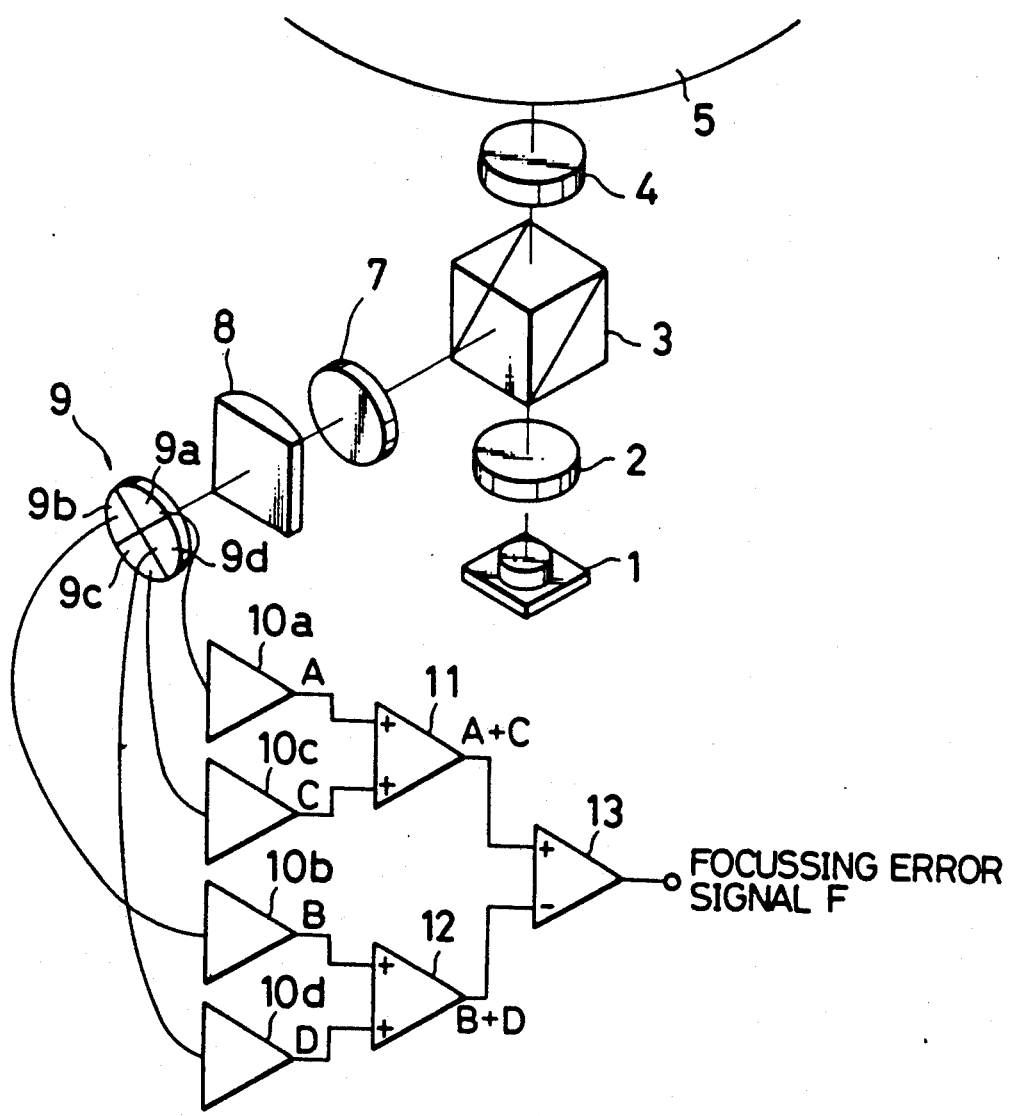
FIG. 1 is a view of a prior art optical head.

The prior art optical head is shown in FIG. 1. A beam of laser light from a laser light source 1 is formed into a parallel pencil of rays by a collimating lens 2 to irradiate an information recording medium 5 via a beam splitter 3 and an objective lens 4. The beam of laser light to be irradiated is focussed by an objective lens 4 on the information recording medium 5. The objective lens 4 is driven by driving means (not shown) and is feedback controlled so as to focus constantly an irradiated beam correctly on the information recording medium 5. A reflected light from the information recording medium 5 passes the objective lens 4 and is splitted by the beam splitter 3 to be led to an error detecting system which is so called "astigmatic difference method" or "astigmatism method".

A focussing error detecting light split from the reflected light by the beam splitter 3 is incident on a quadrant photo detector 9 via a convex lens 7 and a cylindrical lens 8. The convex lens 7 converges the focussing error detecting light on the quadrant photo detector 9, and the cylindrical lens 8 forms the focussing error detecting light into an astigmatic pencil of rays, which has astigmatic wave fronts. The quadrant photo detector 9 is divided in four light detecting sections with the optical axis as the center. The four light detecting sections 9a, 9b, 9c, and 9d have their respective operational amplifiers 10a, 10b, 10c, and 10d. Detecting signals from the respective light detecting sections 9a, 9b, 9c, and 9d are amplified respectively by the operational amplifiers 10a, 10b, 10c, and 10d, and then processed by adders 11 and 12, and a subtractor 13 to be outputted as a focussing error signal. When detecting signals of the light detecting sections 9a, 9b, 9c, 9d are represented respectively by A, B, C and D, a focussing error signal F is given by the following formula $$F=(A+C)-(B+D).$$

A focussing error signal is outputted in accordance with a deflection of the information recording medium 5 from the focal point of the objective lens.

When the information recording medium 5 is located before the focal point of the objective lens 4, the focussing error detecting light is spotted on the quadrant photo detector 9 in a vertically elongated shape as shown in FIG. 2(a). The detecting signals A and C from the light detecting sections 9a and 9c become accordingly larger, and those B and D from the light detecting sections 9b and 9d become accordingly smaller. Resultantly the focussing error signal F becomes positive.

When the information recording medium 5 is located correctly on the focal point of the objective lens 4, the focussing error detecting light is spotted on the quadrant photo detector 9 in a circular shape as shown in FIG. 2(b). The detecting signals A, B, C and D from the light detecting sections 9a, 9b, 9c and 9d have the same level. Resultantly the focussing error detecting signal F becomes zero.

When the information recording medium 5 is located behind the focal point of the objective lens 4, the focussing error detecting light is spotted on the quadrant photo detector 9 in a horizontally elongated shape as shown in FIG. 2(c). The detecting signals A and C from the light detecting sections 9a and 9c become smaller, and the detecting signals B and D from the light detecting sections 9b and 9d become larger. Resultantly the focussing error signal F becomes negative.

Figure 3:
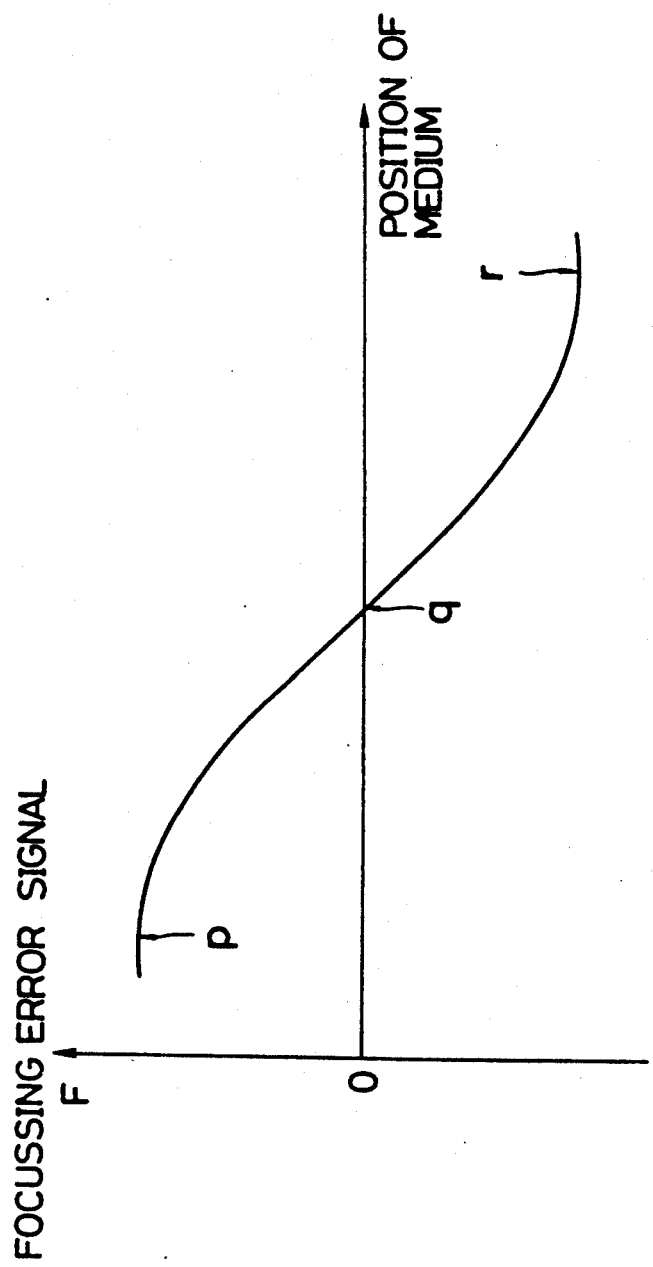
FIG. 3 is a graph showing the focussing error signal of the prior art optical head.

The relationship between the position of the information recording medium 5 with respect to the objective lens 4, and the focussing error detecting signal F is shown in FIG. 3. The position p of FIG. 2(a) where a focussing error signal F becomes maximum becomes the focal point of the saggital plane of the focussing error detecting light, which is an astigmatic pencil of rays. The position r of FIG. 2(c) where the focussing error detecting signal F becomes minimum becomes the focal point of the meridional plane of the focussing error detecting light, which is an astigmatic pencil of rays. At the position q of FIG. 2(b), the information recording medium 5 is agreed correctly with the focal point of the objective lens 4.

Thus, the focussing error signal F varies in accordance with positions of the information recording medium 5 with respective to the objective lens 4. The focussing error signal F is feedback to driving means for the objective lens 4 so that the driving means controls a beam of laser light to be focussed correctly on the information recording medium 5.

But in the above described prior art optical head, since the convex lens 7 and the cylindrical lens 8 are used to form a focussing error detecting light into an astigmatic pencil of rays, which is to be focussed on the quadrant optical detector 9, it is difficult to miniaturize the error detecting system and reduce the weight of the system. Besides, in order to improve the error detecting precision, it is necessary to increase the longitudinal magnification between the information recording medium 5 and the quadrant photo detector 9 so as to decrease the astigmatic difference. To this end the curvature of radius of the cylindrical lens 8 has to be made large. Increasing the curvature of radius not only makes it difficult to obtain eccentricity precision and generatrix precision in maching the cylindrical lens, and consequently its production cost goes up, but also makes it difficult to align the convex lens 7, the cylindrical lens 8 and the quadrant photo detector 9.

Next, the error detecting device for an optical head according to one embodiment of this invention is shown in FIG. 4.

The error detecting device according to this embodiment is different from the prior art error detecting device in that in this embodiment a quadrant Fresnel zone plate 20 is used in place of the convex lens 7 and the cylindrical lens 8, and an tracking error signal as well as a focussing error signal are produced from an output signal of the quadrant photo detector 9.

As shown in FIG. 5, the general Flesnel zone plate comprises concentric rings of radii proportional to an integral square root, which are opaque every two rings so that the light passing through the respective opaque rings are converged in the same phase, whereby, owing to the diffractions, the Flesnel zone plate does the same function as a lens. When the focal length of a primary diffracted light is represented by f, the radius rk of the boundary between the k-th transparent and opaque rings is given by $rk^2 = k \times f \times \lambda$. $\lambda$ indicates a wavelength of an incident light. Each opaque ring is prepared by forming a chromium layer on a transparent substrate by sputtering or others. Actually the Flesnel zone plate 20 comprises rings as many as 200, but drawings illustrate only some rings for simplification.

FIG. 6 shows the quadrant Flesnel zone plate 20 used in this embodiment. The quadrant Flesnel zone plate 20 are divided in four sections 20a, 20b, 20c, and 20d by two parting lines 201 passing the center 20o orthogonally to each other. The transparent and the opaque rings are so arranged that a primary diffracted light has an equal focal length between the regions 20a and 20c opposed to each other across the center and the regions 20b and 20d opposed to each other across the center. When the focal length of the primary diffracted light in the regions 20a and 20c is represented by fa, and that of the regions 20b and 20d is represented by fb, an astigmatic difference Δ is given by $$\Delta = fa - fb.$$

wherein radii rak and rbk of the respective boundaries of the k-th transparent and the opaque rings in the regions 20a and 20c and in the regions 20b and 20d are given by $$rak^2 = k \times fa \times \lambda$$

$$rbk^2 = k \times fb \times \lambda$$

wherein k is 1, 2, 3, . . . , and $\lambda$ is a wavelength of a reflected light from the information recording medium 5. An astigmatic difference $\Delta$ is converted into a length in the information recording medium 5 by $$\Delta' = \Delta/\beta^2$$

wherein $\beta$ is a lateral magnification between the information recording medium 5 and the quadrant photo detector 9 of this optical system, and $\beta^2$ is a longtudinal magnification.

Generally the astigmatic difference $\Delta$ of the information recording medium 5 is about 10-15 μm. Based on this value, an astigmatic difference $\Delta$ and a horizontal magnification $\beta$ are determined, and a focal lengths fa and fb in the regions 20a and 20c, and of the regions 20b and 20d are given. And rak and rbk are automatically given.

The two parting lines 201 thus determined are arranged so as to overlap the two parting lines of the quadrant photo detector 9 as viewed in the direction of the optical axis.

Detecting signals A, B, C, and D from the respective light detecting regions of a quadrant photo detector 9 are computed by adders 11 and 12, and a subtractor 13 to produce a focussing error signal F, while being processed by subtractor 15 so as to produce a tracking error signal T. A focussing error signal F and a tracking error signal T are given by the following formulae $$F = (A+C) - (B+D)$$

$$T = (D-B).$$

Spots shown in FIG. 7 are formed on the quadrant photo detector 9 in accordance with positions of the objective lens 4 with respect to the information recording medium 5.

When the information recording medium 5 is located before the focal point of the objective lens 4, as shown in FIG. 7(a), the error detecting light forms a spot which is larger in the light detecting sections 9a and 9c and smaller in the light detecting sections 9b and 9d. Accordingly the focussing error signal F becomes positive.

When the information recording medium 5 is located correctly at the focal point of the objective lens 4, as shown in FIG. 7(b), the error detecting light forms a circular spot on the quadrant photo detector 9. The spot is equal in the light detecting sections 9a, 9b, 9c and 9d. Accordingly the focussing error signal F becomes 0.

When the information recording medium 5 is located behind the focal point of the objective lens 4, as shown in FIGS. 7(c), the error detecting light forms a beam spot which is smaller in the light detecting sections 9a and 9c and larger in the light detecting sections 9b and 9d. Accordingly the focussing error signal F becomes negative.

FIGS. 7(a)-(c) show cases where a focussing error alone is present without a tracking error. In a case where a tracking error alone is present without a focussing error, the error detecting light forms a spot shown in FIG. 7(d) on the quadrant photo detector 9. Specifically, the shape of the spots is the same as in FIG. 7(b) where the information recording medium 5 is in focus, but the brightness differs in accordance with tracking errors. FIG. 7(d) shows a case where a tracking error takes place horizontally, i.e., a light amount differs between the light detecting sections 9b and 9d in accordance with a tracking error. Even when a tracking error is present, a light intensity does not differ between the light detecting sections 9a and 9c. Resultantly the tracking error signal T becomes positive or negative in accordance with tracking errors. In FIG. 7(d), since a light intensity in the light detecting section 9d is larger than the light detecting section 9c, the tracking error signal T becomes positive.

As described above, according to this embodiment, the combination of a convex lens and a cylindrical lens in the prior art error detecting device is replaced by one quadrant Flesnel zone plate, so that an error detecting light can be converted into an astigmatic pencil of rays to be converged on a quadrant photo detector.

Both the quadrant Flesnel zone plate and the quadrant photo detector of the above-described embodiment in FIG. 4 may be located at a position where the parting lines of the quadrant Flesnel zone plate and the quadrant photo detector are displaced by 45 degrees from their positions in FIG. 4. At this time, the tracking error signal T is given by the formula $$T = (A-C) + (C-B).$$

The quadrant Flesnel zone plate of the above described embodiment is transparent at the center and has a primary phase of zero degree, but the primary phase may have any value.

Figure 8A:
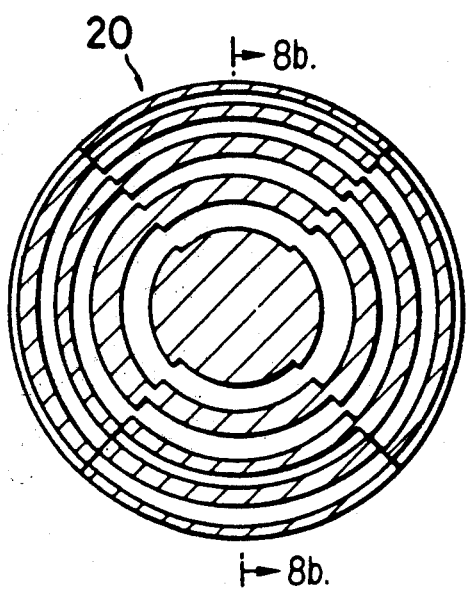
FIGS. 8(a) and (b) are a plan view of one modification of the quadrant Fresnel zone plate of FIG. 6, and a sectional view of the same along the line c—c'.
Figure 8B:

For example, as shown in FIG. 8, the transparent and the opaque rings of FIGS. 6 may be inversed so that the primary phase is 180 degrees.

Figure 9A:
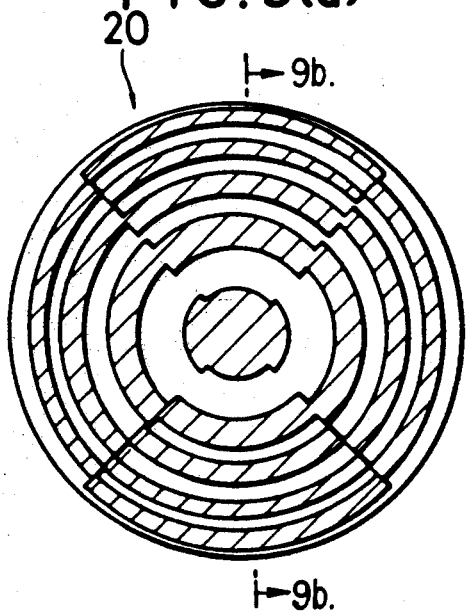
FIGS. 9(a) and (b) are a plan view of another modification of the quadrant Fresnel zone plate of FIG. 6, and a sectional view of the same along the line d—d'.
Figure 9B:

The primary phase may be 60 degrees as shown in FIG. 9.

The Flesnel zone plate can detect the errors with a primary phase of any degree. Experiments conducted by the inventors, however, show that the primary phase have preferably about 30-60 degrees; when the primary phase has zero degree, the zeroth order deflected light makes the diameter of an error detecting light spot large, with a result of poor error detection precision; when the primary phase has 180 degrees, most of the largest intensity region in Gaussian distribution of light is blocked by the central spot, with a result of large loss of the light amount; and when the primary phase has about 30-60 degrees, the light intensity is sufficient without deterioration of the error detecting precision.

The optical system for making an error detecting light astigmatic is not limited to the above described Flesnel zone plate but may cover various modifications.

Figure 10A:
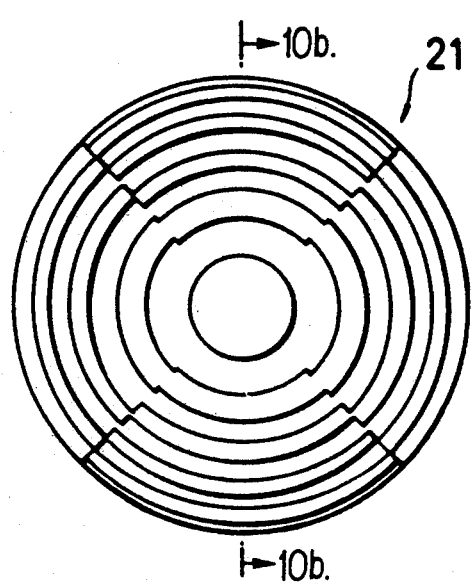
FIGS. 10(a) and (b) are a plan view of one example of a phase reversal type quadrant Fresnel zone plate used in the error detecting device for an optical head of FIG. 4, and a sectional view of the same along the line e—e'.
Figure 10B:

FIG. 10 shows an example of a quadrant phase reversal type Flesnel zone plate 21. The quadrant phase reversal type Flesnel zone plate 21 has a 180 degree phase delay every two rings in place of the transparent and the opaque rings arranged every two rings. Specifically, stepped rings of a height h are provided in the place of the opaque rings. When a wavelength of an error detecting light is represented by λ, and a refractive index is indicated by n, a height h required for 180 degrees retardation is given by $$h = \lambda/2(n-1).$$

This quadrant phase reversal type Flesnel zone plate 21 more improves firstorder collecting efficiency than the binary transmitted type Flesnel zone plate having the transparent and opaque rings. The binary transmitted type Flesnel zone plate has a diffraction efficiency of abut 10%, but the phase reversal type Flesnel zone plate 21 has a diffraction efficiency of about 40%. The example of FIG. 10 has a primary phase of 60 degrees as an example only, but the quadrant phase reversal type Flesnel zone plate 21 may have a primary phase of any degree. Fine stepped rings of a required height were formed by the fine processing technique for fabricating semiconductor devices.

Figure 11A:
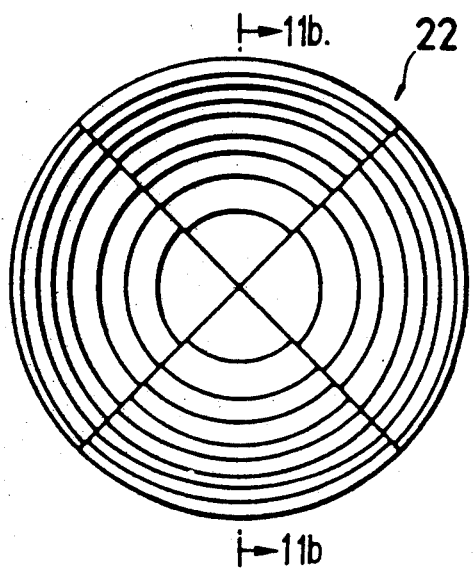
FIGS. 11(a) and (b) are a plan view of one example of a quadrant Fresnel lens used in the error detecting device for an optical head of FIG. 4, and a sectional view of the same along the line f—f'.
Figure 11B:
Figure 12A:
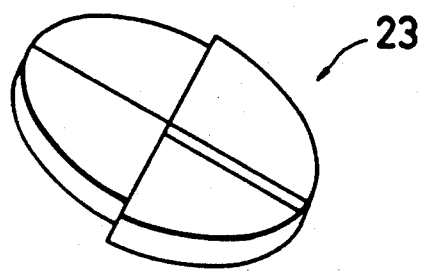
FIGS. 12(a), (b), (c) and (d) are a perspective view, a plan view, a side view, and a front view of one example of a quadrant convex lens used in the error detecting device for an optical head.
Figure 12B:
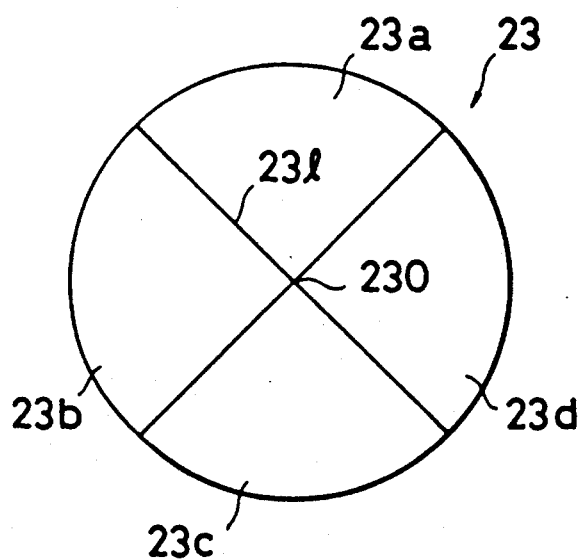
Figure 12C:
Figure 12D:

FIG. 11 shows a Flesnel lens comprising many lenses arranged in a multi ring fashion. FIG. 11(b) shows its characteristic sectional profile. This Flesnel lens is divided in four sections, and the four sections are composed of a quadrant Flesnel lens 22. The sections are offset radially from one another so that the respective rings are discontinued at the parting lines, whereby an error detecting light passing the Flesnel lens 22 is converted into an astigmatic pencil of rays having two focal points.

FIG. 12 shows a quadrant convex lens 23 comprising an assembly of four divided sections of a convex lens, which is used in the error detecting optical system. The quadrant convex lens 23 is divided into four sections 23a, 23b, 23c, and 23d by two parting lines 231 passing the center 23o orthogonally to each other. The regions 23a and 23c opposed across the center, and the regions 23b and 23d opposed across the center are offset radially from each other, so that an error detecting light passes the quadrant convex lens 23 can be converted into an astigmatic pencil of rays having tow focal points.

Figure 13A:
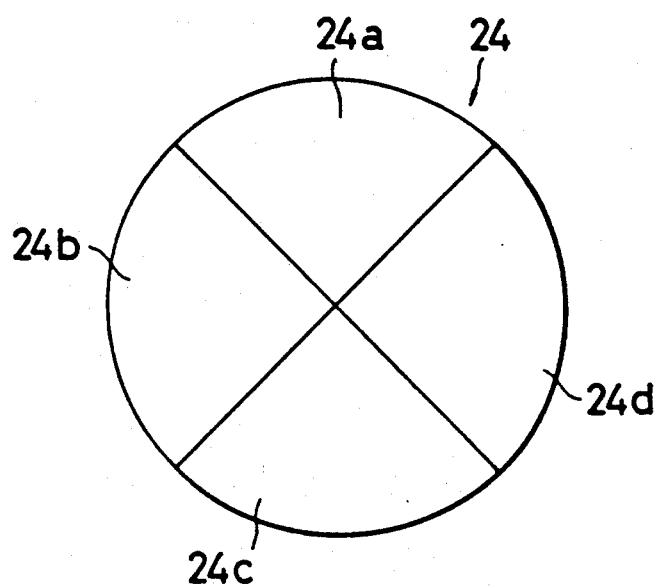
FIGS. 13(a), (b) and (c) are a plan view, a side view, and a front view of another example of the quadrant convex lens.
Figure 13B:
Figure 13C:

In the quadrant convex lens 24 shown in FIG. 13, regions 24a and 24c opposed across the center and regions 24b and 24d opposed across the center have different curvatures of radius from each other so as to differ their focal lengths, and the bottom surface of the quadrant convex lens 24 is made flat.

It is also possible to use a convex lens having regions each opposed across the center which have the same profile but are made of materials of different refractive indices so that the regions have different focal lengths.

This invention is not limited to the above described embodiment but cover various modifications. For example, in the above described embodiment, the optical system is divided in four sections but may be divided in any number of sections, e.g., in two, three or eight sections. In short, the optical system for the error detection comprises a first focussing member for focussing an error detecting signal to a first focal point, and a second focussing member for focussing an error detecting light to a second focal point, and the first and the second members are formed integral.

What is claimed is:

1. An error detecting device for an optical head, comprising:
   optical means for converting a reflected light of a light irradiating a surface to be irradiated into an astigmatic pencil of rays having a first focal point and a second focal point, said optical means having a first focusing means for focusing said reflected light on said first focal point of said astigmatic pencil of rays, and a second focusing member for focusing said reflected light on said second focal point of said astigmatic pencil of rays, said first and second focusing members being made integral; and
   means for detecting errors of said light irradiating the surface to be irradiated, based on a detecting signal of a spot of said reflected light formed by said first focusing member, and a detecting signal of a spot of said reflected formed by said second focusing member, wherein said optical means is provided by a Fresnel zone plate, said zone plate including;
   a first, second, third and a fourth Fresnel zone plate member divided in four by two parting lines passing the center of said Fresnel zone plate,
   said first and said third Fresnel zone plate members opposed to each other across said center has said first focal point, and
   said second and said fourth Fresnel zone plate members opposed to each other across said center has said second focal point; and
   said detecting means having:
   a first, a second, a third and a fourth detecting section for respectively detecting a spot of said reflected light formed by said first, said second, said third and said fourth Fresnel zone plate members,
   a focusing error computing unit for computing a focusing error signal, based on detecting signals from said first, said second, said third and said fourth detecting sections, and
   a tracking error computing unit for computing a tracking error signal, based on detecting signals from at least said second and said fourth detecting sections.

2. An error detecting device for an optical head according to claim 1, wherein said Fresnel zone plate is provided by a phase reversal type Fresnel zone plate.

3. An error detecting device for an optical head according to claim 1, wherein said Fresnel zone plate is provided by a binary transmitted type Fresnel zone plate.

4. An error detecting device for an optical head according to claim 3, wherein said binary transmitted type Fresnel zone plate has a primary phase of about 30 to 60 degrees.

5. An error detecting device for an optical head, comprising:
   optical means for converting a reflected light of a light irradiating a surface to be irradiated into an astigmatic pencil of rays having a first focal point and a second focal point, said optical means having a first focusing means for focusing said reflected light on said first focal point of said astigmatic pencil of rays, and a second focusing member for focusing said reflected light on said second focal point of said astigmatic pencil of rays, said first and second focusing members being made integral; and
   means for detecting errors of said light irradiating the surface to be irradiated, based on a detecting signal of a spot of said reflected light formed by said first focusing member, and a detecting signal of a spot of said reflected formed by said second focusing member, wherein said optical means is provided by a Fresnel zone plate, wherein said Fresnel zone plate is provided by a binary transmitted type Fresnel zone plate.

6. An error detecting device for an optical head according to claim 5 wherein said binary transmitted type Fresnel zone plate has a primary phase of about 30 to 60 degrees.

7. An error detecting device for an optical head, comprising:
- optical means for converting a reflected light of a light irradiating a surface to be irradiated into an astigmatic pencil of rays having a first focal point and a second focal point, said optical means having a first focusing means for focusing said reflected light on said first focal point of said astigmatic pencil of rays, and a second focusing member for focusing said reflected light on said second focal point of said astigmatic pencil of rays, said first and second focusing members being made integral; and
- means for detecting errors of said light irradiating the surface to be irradiated, based on a detecting signal of a spot of said reflected light formed by said first focusing member, and a detecting signal of a spot of said reflected formed by said second focusing member, wherein said optical means is provided by a Fresnel lens, said lens including;
- a first, second, third and a fourth Fresnel lens member divided in four by two parting lines passing the center of said Fresnel lens,
- said first and said third Fresnel lens members opposed to each other across said center has said first focal point, and
- said second and said fourth Fresnel lens members opposed to each other across said center has said second focal point; and
- said detecting means having:
- a first, a second, a third and a fourth detecting section for respectively detecting a spot of said reflected light formed by said first, said second, said third and said fourth Fresnel lens members,
- a focusing error computing unit for computing a focusing error signal, based on detecting signals from said first, said second, said third and said fourth detecting sections, and
- a tracking error computing unit for computing a tracking error signal, based on detecting signals from at least said second and said fourth detecting sections.

8. An error detecting device for an optical head, comprising:
- optical means for converting a reflected light of a light irradiating a surface to be irradiated into an astigmatic pencil of rays having a first focal point and a second focal point, said optical means having a first focusing means for focusing said reflected light on said first focal point of said astigmatic pencil of rays, and a second focusing member for focusing said reflected light on said second focal point of said astigmatic pencil of rays, said first and second focusing members being made integral; and
- means for detecting errors of said light irradiating the surface to be irradiated, based on a detecting signal of a spot of said reflected light formed by said first focusing member, and a detecting signal of a spot of said reflected formed by said second focusing member, wherein said optical means is provided by a convex lens, said zone plate including;
- a first, second, third and a fourth convex lens member divided in four by two parting lines passing the center of said convex lens,
- said first and said third convex lens members opposed to each other across said center has said first focal point, and
- said second and said fourth convex lens members opposed to each other across said center has said second focal point; and
- said detecting means having:
- a first, a second, a third and a fourth detecting section for respectively detecting a spot of said reflected light formed by said first, said second, said third and said fourth convex lens members,
- a focusing error computing unit for computing a focusing error signal, based on detecting signals from said first, said second, said third and said fourth detecting sections, and
- a tracking error computing unit for computing a tracking error signal, based on detecting signals from at least said second and said fourth detecting sections.

* * * * *